J. D. Haynie.
Corn Coverer.

Nº 78,665.  Patented Jun. 9, 1868.

Witnesses:
Chas Haus
Jas H Layman

Inventor:
Jacob D Haynie
By Knight Bros
Attys

United States Patent Office.

JACOB D. HAYNIE, OF NEW ANTIOCH, OHIO.

Letters Patent No. 78,665, dated June 9, 1868.

---

IMPROVEMENT IN CORN-COVERER.

---

The Schedule referred to in these Letters Patent and making part of the same.

---

TO WHOM IT MAY CONCERN:

Be it known that I, JACOB D. HAYNIE, of New Antioch, Clinton-county, Ohio, have invented a new and useful Corn-Coverer; and I hereby declare the following to be a full, clear, and exact description thereof, reference being had to the accompanying drawings, making part of this specification.

This invention relates to an implement for covering corn after it has been dropped into the furrows, and the principal members of the machine consist of two series of tines, which rake the large clods, grass, &c., away from the furrows, two shares, for throwing the loose earth upon the corn, and a weighted roller, which pulverizes the remaining clods, and reduces the field to a smooth and level surface, so as to permit of its being ploughed and cultivated with the least amount of labor.

In the accompanying drawings—

Figure 1:
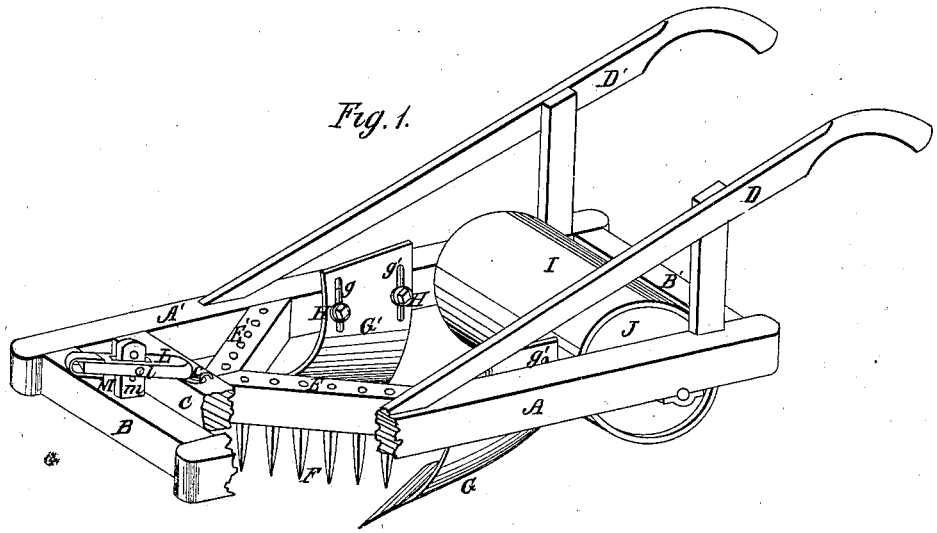
Figure 1 is a perspective view of my corn-coverer, a portion of the frame being broken away, so as to exhibit the tines more clearly.
Figure 2:
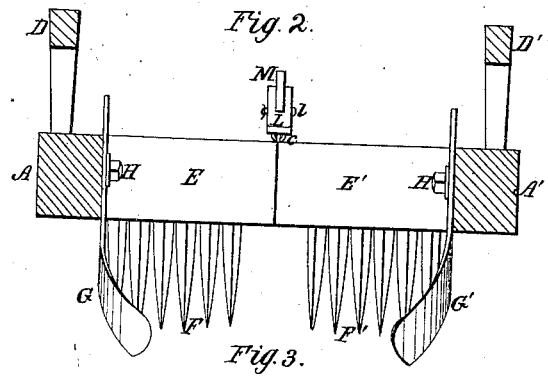
Figure 2 is a transverse section of the implement, taken immediately in front of the roller.
Figure 3:
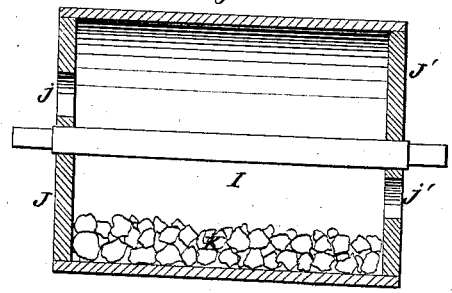
Figure 3 is a longitudinal section of the roller.

The frame of the machine consists of two side-beams, A A', which are united by the transverse pieces B B' C; and said frame is provided with handles, D D', similar to those of a plough or cultivator.

United to the mid-length of the beam C are two beams, E E', which, diverging rearwardly, are connected to the side-beams A A'; and said diverging beams are armed with two series of teeth or tines, F F', which may be made either of wood or metal.

G G' are shares or coverers, which are attached to the side-beams A A'; and these shares are rendered capable of being adjusted vertically, by means of the slots $g\ g'$ and bolts H.

Journalled in the frame of the machine, and near its rear end, is a hollow drum or roller, I, whose heads, J J', are provided with apertures, $j\ j'$, which permit of said roller being loaded with stones, K, or other weights.

Connected with the beam C by a link and staple, $c$, is a clevis, L, which is adjusted by means of the pin $l$, which enters apertures $m$ in the standard M.

The operation of my corn-coverer is as follows:

The field is first furrowed, and the corn dropped, in the usual manner, after which the coverer is drawn across the field in such a manner that the centre of the implement is directly over the furrow, it being understood that the machine is to cover one row of corn at a time. The two series of tines F F', being near the front end of the machine, are the first to come into action, and their divergence causes the larger clods, roots, grass, &c., to be thrown off to either side of the furrow, thereby leaving nothing but the smaller clods and loose earth for the shares G G' to throw up and cover the corn with.

The larger clods having been thus raked away from the furrow, and the corn covered with loose light earth, the weighted roller I presses the earth down on the corn, so as to cover it, and, by pulverizing the clods, &c., it imparts a smooth and uniform surface to the corn-field, which renders the after-ploughing and cultivation of the crop a comparatively easy matter.

The implement can be regulated so that the shares G G' will throw more or less earth upon the corn, by simply adjusting the clevis L so as for said shares to penetrate the earth to a greater or less depth.

My implement will cover corn with greater rapidity, and in a more thorough and effectual manner, than it can be done by hand, thus saving much valuable time to the farmer at the season when labor is most needed.

I claim herein as new, and of my invention—

1. The arrangement, substantially as described, of the two series of rearwardly-diverging tines F F', adjustable shares G G', $g\ g'$, H, and roller I, as and for the purpose set forth.

2. In combination with the described elements, F F', G G', $g\ g'$, H, and I, of the preceding clause, I also claim the adjustable clevis L $l$, M $m$, for the object explained.

In testimony of which invention, I hereunto set my hand.

JACOB D. HAYNIE.

Witnesses:
GEO. H. KNIGHT,
JAMES H. LAYMAN.